(12) United States Patent
Wang

(10) Patent No.: US 6,863,454 B2
(45) Date of Patent: Mar. 8, 2005

(54) PHOTOGRAPHIC FILM CARTRIDGE AND CAMERA INCLUDING SUCH

(75) Inventor: Ching Miao Wilson Wang, Chai Wan (HK)

(73) Assignee: Ginfax Development Limited (HK)

( * ) Notice: Subject to any disclaimer, the term of this patent is extended or adjusted under 35 U.S.C. 154(b) by 59 days.

(21) Appl. No.: 10/083,331

(22) Filed: Feb. 25, 2002

(65) Prior Publication Data

US 2003/0086708 A1 May 8, 2003

(30) Foreign Application Priority Data

Nov. 2, 2001 (NL) ................................................ 515259

(51) Int. Cl.$^7$ .............................................. G03B 17/02
(52) U.S. Cl. ........................ 396/511; 396/513; 396/538
(58) Field of Search ................................ 396/511, 512, 396/513, 538

(56) References Cited

U.S. PATENT DOCUMENTS 3,918,075 A   11/1975  Horn et al.
4,769,556 A   9/1988   Meisner
4,841,319 A * 6/1989   Hansen ........................ 396/439
5,799,222 A * 8/1998   Ishihara ....................... 396/538
6,249,646 B1 * 6/2001   Chen ............................. 396/6
6,450,709 B1 * 9/2002   Tatamiya ..................... 396/513

FOREIGN PATENT DOCUMENTS

EP    1 120 681 A1   8/2001   ........... G03B/19/04
WO    WO 98/11469    3/1998

* cited by examiner

Primary Examiner—David M. Gray
(74) Attorney, Agent, or Firm—Ostrolenk, Faber, Gerb & Soffen, LLP

(57) ABSTRACT

A combination of a camera body with a lens, shutter and shutter operating control with an attachable, removeable film cartridge having an unexposed film spool region and an exposed film spool region and a bridging portion between those regions. An opening in the cartridge permits light from the lens to pass through the opening to the film at the bridging portion. A door closes the opening of the cartridge and the door is openable with the cartridge installed in or attached to the camera body. Cooperating elements on the camera body and the cartridge open the door or close the door with the door being openable when the cartridge is fully engaged with the camera body. There is a detented connection of the film cartridge in the camera body.

29 Claims, 20 Drawing Sheets

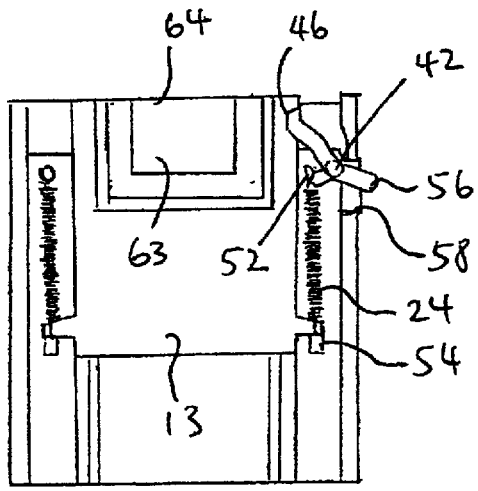 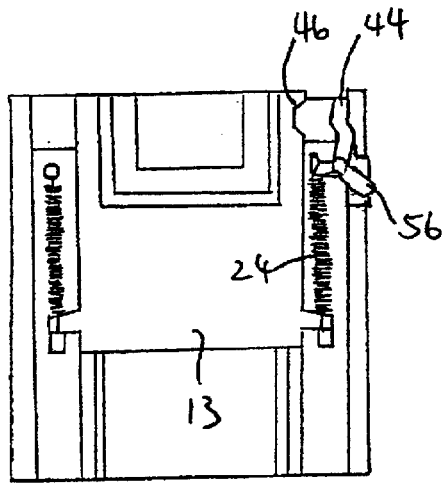
FIGURE 8(a)  FIGURE 8(b)
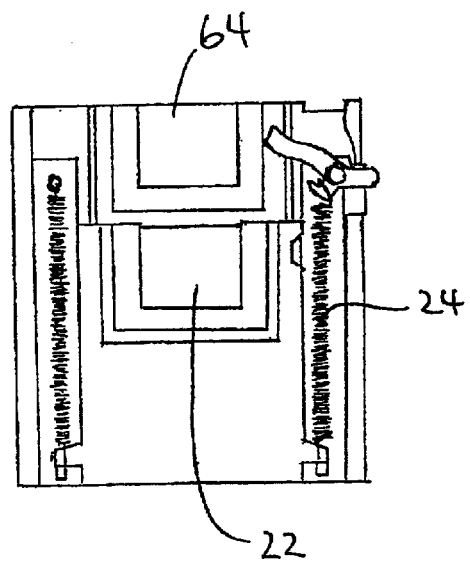
FIGURE 8(c)

PHOTOGRAPHIC FILM CARTRIDGE AND CAMERA INCLUDING SUCH

FIELD OF INVENTION

The present invention relates to a photographic film cartridge and camera including the cartridge and in particular although not solely of a kind to provide a semi disposable use.

BACKGROUND OF THE INVENTION

Nowadays, commonly used photographic films include 135 films, 120 films, 110 films and APS films, among which 135 films are the most popular films. 120 films are mainly used for commercial purposes because of their high quality and larger sizes. The size of 110 films is relatively small and its quality is relatively low, so it is not very popular. APS is a new technology and has a lot of advanced features, however, its film development system is not compatible with 135's, so the growth of APS has been restricted.

The development of disposable cameras has been comparatively fast. There are many advantages in that they are easy to operate, low in cost, easy to carry and the quality is acceptable. Disposable cameras are particularly suitable for beginners. Since the procedures of inserting and removing the film involves some degree of knowledge and skill, the current disposable camera avoids the possibility of errors as far as loading of films is concerned because the film is pre-loaded.

There are two main disadvantages of disposable cameras. The cost of buying the camera includes both the camera set and the film set, but the camera set is disposed of after a single use although some of them may be recycled. This creates waste. Secondly, being a disposable item in nature, there is tight control on the production cost which therefore restricts the inclusion of more advanced features such auto flash, auto wind and higher quality lens.

People have been trying to develop a product which can produce good quality photos like an ordinary 135 film camera but at the price of and with simplicity of operations of a disposable camera.

A combination camera body with features such as the lens, shutter, dark room and film winder which was capable of receiving a replaceable film cartridge has been available to the public before. The cartridge for use with the camera body came in the form of two film spooling regions, a first where the film was spooled in a used state and another spooling region to which the film was advanced after having been exposed. The two spooling regions were interconnected by a bridging portion wherein the bridging portion held the film in a position relative to the lens and shutter to allow exposure of each frame of the film. The spooling regions were effectively light sealed regions such that any film within the spooling regions could not be exposed to light. The film extending across the bridging region was able to be exposed to light and, when in use, such light was controlled by the lens and shutter arrangement of the camera body. The cartridge, outside of the camera body, did not provide any dark room effect to the film between the two spooling regions. Hence the use of cameras of this type required the film to be inserted into the camera body and remain within the body during the stages where the film was advanced from one spooling region to another, if no undesirable exposure of the film was to occur as a result of the cartridge being removed from the camera body and thereby allowing any films extending across the bridging region to be exposed. Such earlier designs hence did not lend themselves to allowing for film cartridges to be removed midway during use of the film without risking detrimental exposure of the film extending between the two spooling regions. Earlier type of design also required separate apparatus for processing the film in terms of handling the film from the cartridge after it had been used. Since the predominant format of film now is the 35 mm format and indeed the earlier film types in the cartridges such as the 110 format are now very uncommon, most development labs are set up for developing the 35 mm format or the APS format. Any introduction of a new format may mean that further handling equipment will need to be purchased by development labs to which there will be resistance. It would hence be desirable for a film cartridge to exist which includes a standard 35 mm film incorporated with a film canister which will make the subsequent handling of the film for development by development labs convenient.

It is accordingly an object of the invention to provide a photographic film cartridge which may be used with a camera body which provides greater flexibility and convenience of use or which will at least provide the public with a useful choice.

It is a further object to provide a camera and film cartridge combination set which provides greater flexibility and convenience of use or which will at least provide the public with a useful choice.

It is a further object of the present invention to provide a film cartridge which includes a preloaded film engaged for scrolling to and/or from a standard 35 mm or APS film canister.

SUMMARY OF THE INVENTION

Accordingly, a first aspect of the present invention broadly comprises a film cartridge containing a film for engagement with a camera body to thereby in combination allow the capturing of an image onto the film in reliance on appropriately provided and positioned light control and projection means of said camera body to selectively allow light to be projected onto a portion of the film in said cartridge to thereby be exposed by said light. The film cartridge comprises: an unexposed film spool region, a second spool region, and a bridging portion between the unexposed film spool region and the second spool region via which the film can be advanced to at least in part be moved from the unexposed film spool region to the second region. The bridging region provides a dark room for the film between the unexposed film spool region and the second spool region. The bridging region includes an opening positioned such that when the film cartridge is engaged with the camera body, film is presented for exposure by light admitted through the light control means of the camera body and the opening of the film cartridge.

A door is provided to the film cartridge to selectively move between a first and second position. In the first position, the cartridge opening is closed to prevent light from entering the dark room. In the second condition, the opening is open to allow exposure of the film.

A second aspect of the present invention broadly comprises a camera having a camera body and a film cartridge containing a film, in engagement with the camera body to thereby in combination allow the capture of an image onto the film in reliance on appropriately provided and positioned light control and projection means of the camera body to selectively allow light to be projected onto a portion of the film in the cartridge to thereby be exposed to light.

The film cartridge comprises: an unexposed film spool region, a second spool region and a bridging portion between the unexposed film spool region and the second spool region via which the film can be advanced to at least in part be moved from the unexposed film spool region to the second region.

The bridging region provides a dark room for the film between the unexposed film spool region and the second spool region. The bridging region includes an opening positioned such that when the film cartridge is engaged with the camera body, film is presented for exposure to light admitted through the light control means of the camera body and the opening of the film cartridge.

A door is provided to the film cartridge to selectively move between a first and second position. In the first position, the opening is closed to prevent light from entering the dark room and in the second condition, the opening is open to allow exposure of the film. The door is preferably maintained in the first position until the cartridge is fully engaged in the camera body.

Preferably, when in a fully engaged condition, the camera body and the cartridge cooperate to define a region which is light sealed except when the light control means is activated to expose part of the film in the bridging portion.

The door is preferably actuated to move between the first and second positions by an actuation means of the camera body. The actuation means preferably engages a safety latch for the door to trigger the movement of the door from the first position to the second position.

A spring is preferably used to move the door from the first position to the second position. The door is preferably pivotably engaged to said bridging region or is translatably engaged to said bridging region.

The actuation means preferably engages a safety latch for the door to trigger the movement of the door from the second position to the first position. A spring is preferably used to move the door from the second position to the first position. The actuation means preferably becomes operable to move the door upon the action of insertion and removal of the cartridge with the camera body.

The actuation means is preferably operable by the action of the user once the cartridge is fully engaged with the camera body. The actuation means is preferably operable upon depression of the camera body shutter control button.

Film provided inside the cartridge is engaged to a film canister, preferably of a standard 35 mm format. The film canister is preferably located at the unexposed film spool region of the cartridge such that during advancement of the film for exposure, the film is at least in part transferred from the canister to the second spool region. The film canister may preferably be located at the second spool region of the cartridge such that during advancement of the film for exposure, the film is transferred from the second spool region to the canister. The film cartridge is preferably provided for use in a condition wherein the unexposed film is in a substantial part spooled in the unexposed spool region and wherein the film extends to a distal end thereof engaged to the film canister located in the second spool region.

A further aspect of the present invention comprises a camera body for use in combination with a film cartridge as hereinbefore described. A further aspect comprises a camera body and at least one film cartridge as hereinbefore described provided in a marketable pack suitable for retail.

Yet another aspect of the present invention broadly consists in a camera or a film cartridge for use to define a camera having a control unit with which the cartridge can, in engagement with the control unit in combination, allow capture of an image onto the film in reliance on appropriately provided and positioned shutter and projection means of the cartridge, to selectively allow light to be projected onto a portion of the film in the cartridge to thereby be exposed by the light, wherein the control unit provides at least one of a trigger for activating the movement of the shutter, a flash, a film winder, a view finder, a film counter.

The film cartridge comprises: an unexposed film spool region, a second spool region and a bridging portion between the unexposed film spool region and the second spool region via which film can be advanced to at least in part be moved from the unexposed film spool region to the second region.

The bridging region provides a dark room for the film between the unexposed film spool region and the second spool region. The bridging region includes a light aperture and shutter and projection means (e.g. a lens) positioned such that when the film cartridge is engaged with the control unit, film is presented for exposure by light selectively admitted through the aperture.

A further aspect of the present invention comprises a film cartridge containing a film of an elongate kind having a first distal end and a second distal end engaged to a spooling spindle within a film canister, the cartridge being engageable with a camera body to thereby in combination allow the capturing of images onto the film in reliance on appropriately provided and positioned light control and projection means of the camera body, which selectively allow light to be projected onto a portion of the film in said cartridge. The film cartridge comprises: an unexposed film spool region, a second spool region within which the film canister is retained and a bridging portion between the unexposed film spool region and the second spool region via which the film can be advanced to at least in part be moved from the unexposed film spool region to the second region.

The bridging region provides a dark room for the film extending between the unexposed film spool region and the second spool region, when the film cartridge is engaged to the camera body. The bridging region includes an opening positioned such that when the film cartridge is engaged with the camera body, that portion of the film in the dark room is presented for exposure to light admitted through the light control means of the camera body and the opening of the film cartridge.

The film cartridge prevents light from entering the unexposed spool. The film cartridge is preferably a housing within which the film is located and sealed from exposure to light save for that portion of the film in the dark room.

The bridging region is preferably an enclosure which includes the opening. The enclosure is preferably also open to the second spool region. The unexposed spool region is preferably enclosed except for a narrow slot through which the film can pass, such that the film in the unexposed film spool region is substantially sealed against light. The second spool region preferably includes means for driving the spooling spindle externally of the film cartridge.

The cartridge may be of one piece. But in an alternate embodiment, it is separable into one part with one of the spool regions and another part with the rest of the cartridge. The parts are detachably latchable together. This facilitates removal of film from the one part and also permits easy installation of a new film supply into the one part, which may then be transferred back to the other spool region. From the other spool region, the film can be returned to the first spool region, this time exposing the film to the images in succession.

The housing of the camera body is preferably a two part housing having a front and rear part separably engaged to each other. The rear part is preferably a lid separably engaged to the front part.

The housing detents the cartridge in the camera body. As the camera body has a receptacle with an opening into it, the photographic film cartridge is installed in the receptacle. It is guided into position by a cooperating protrusion into groove connectors.

Once the cartridge is fully installed, detent tabs on the camera body snap into recesses in the rear of the cartridge and retain the cartridge. To release the cartridge a release device moves the tabs off the cartridge. It may comprise a lever or bar which is shifted to raise the tabs. A switch operates the lever or bar to release the cartridge.

This invention may also be said broadly to consist of the parts, elements and features referred to or indicated in this specification, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

FIGS. 8(a), 8(b) and 8(c) respectively illustrate three stages in the operation of the film cartridge door.

DETAILED DESCRIPTION OF THE PREFERRED EMBODIMENTS

Figure 1:
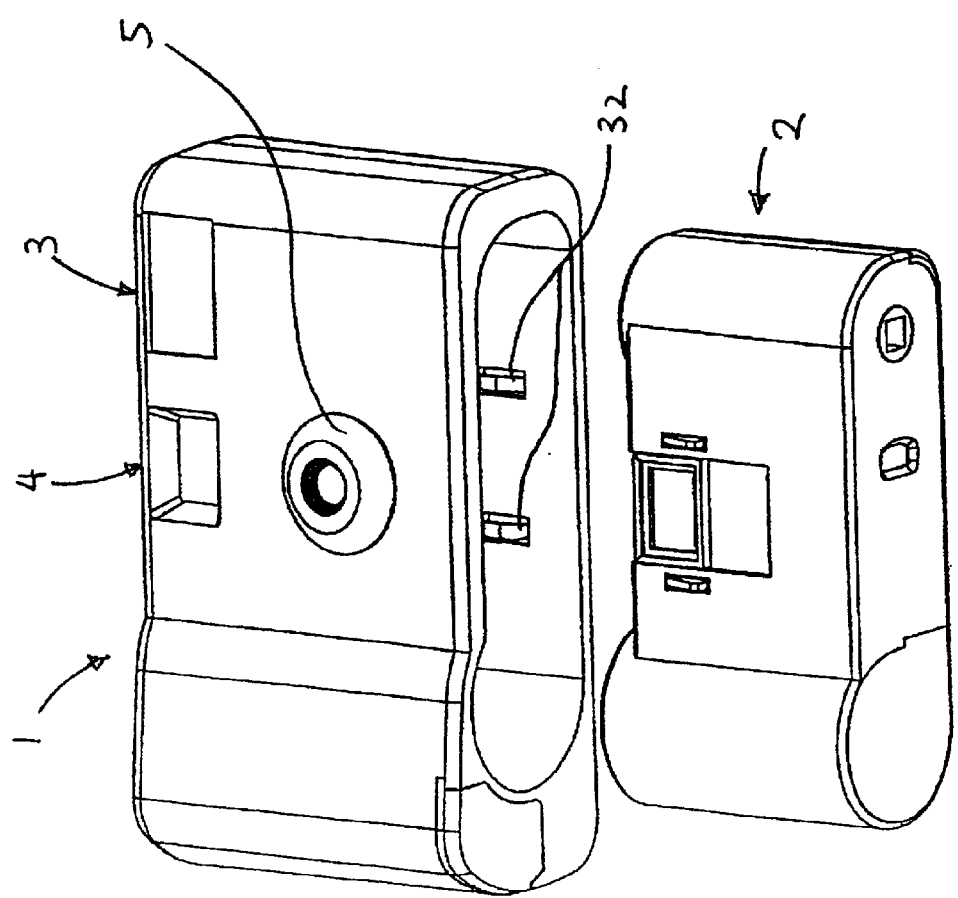
FIG. 1 shows a camera body and cartridge film prior to it being engaged with the body.

FIG. 1 illustrates a camera body 1 and a film cartridge 2, which in this view is inserted into the camera body from below. On the front of the camera body there is a view finder 4, a camera flash 3 and a light control means, typically a camera lens 5. Spring loaded arms 32 bear against the back of the film cartridge to locate the cartridge in position. A camera with flash function and auto winding function will also include electric circuits for the flash light and the motor, a battery slot and a gear system.

Figure 2:
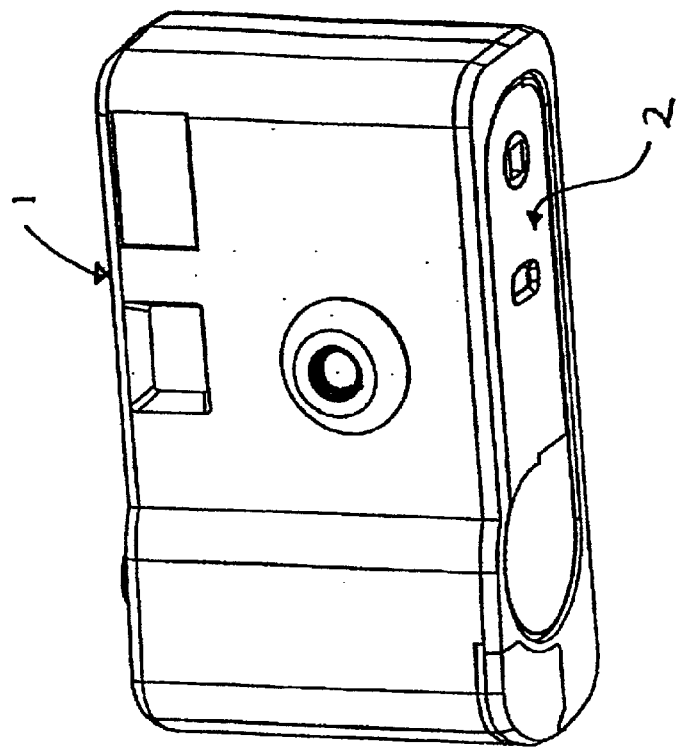
FIG. 2 is a perspective view of the film cartridge inserted in the camera body.

FIG. 2 shows the fully assembled camera comprising the camera body 1 and the film cartridge 2 which has been inserted from below and locked into position.

Figure 6:
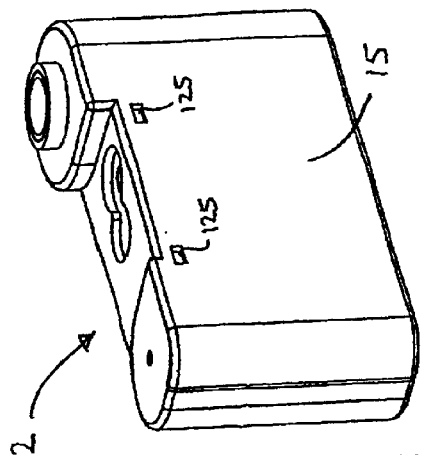
FIG. 6 shows the fully assembled film cartridge.
Figure 3:
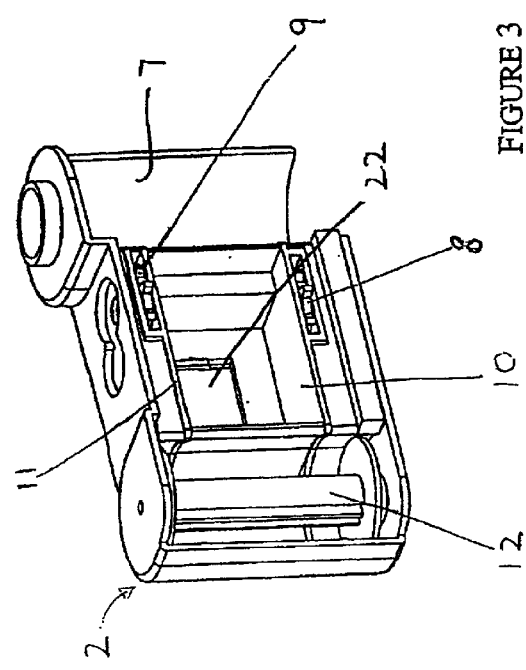
FIG. 3 is the film cartridge with the backing plate of the cartridge and the film removed.
Figure 6A:
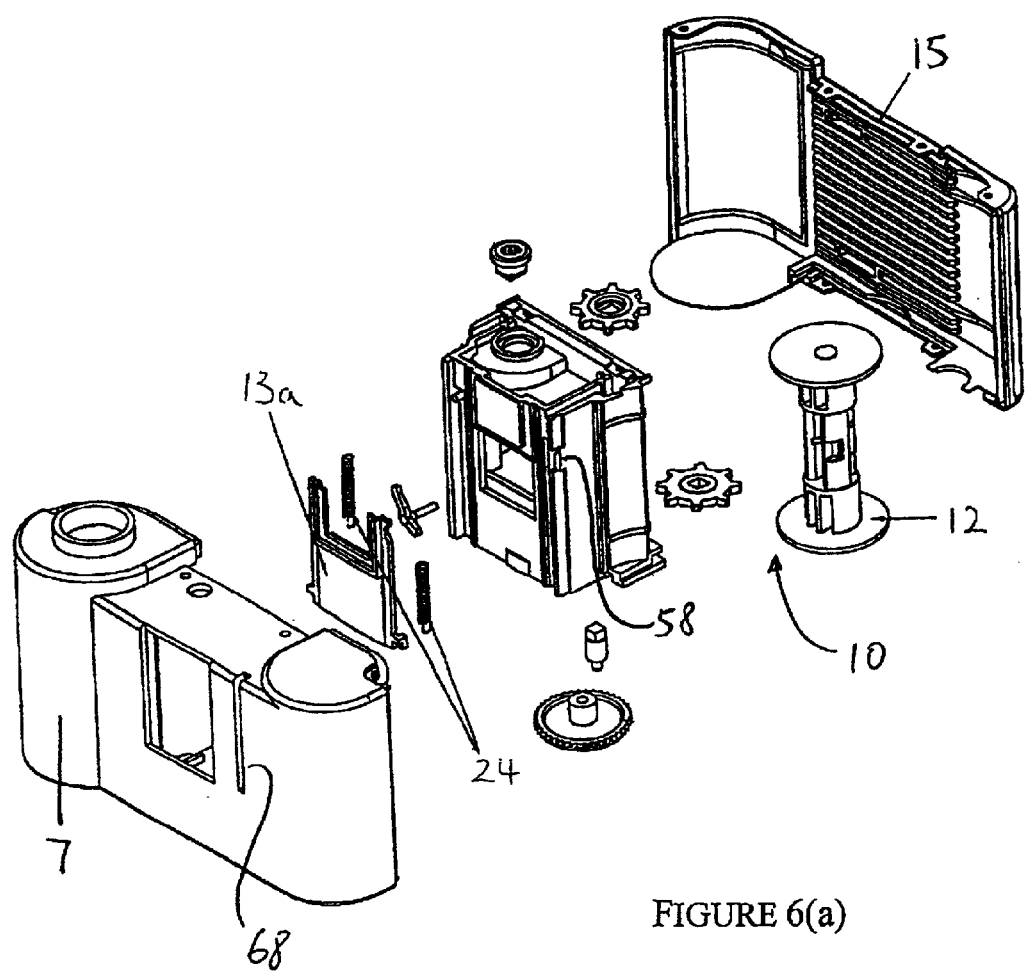
FIG. 6(a) is an exploded perspective view of an embodiment of the film cartridge.

FIGS. 3 and 6(a) show the disassembled film cartridge 2 with the back plate removed and the film removed. The film cartridge internals comprise a region 7 for exposed film and advancing sprockets 8 and 9 at the top and bottom respectively of the film cartridge to positively engage the film at its periphery. A film supporting structure 11 runs around the periphery of the dark room 10, which together with the backing plate 15 and a film cartridge door 13 provides a light proof chamber for the film inside the cartridge. A spool 12 contained within the body of the film cartridge 2 allows the winding on of a section of film into the dark room and subsequent exposure for an image to be captured.

Figure 4:
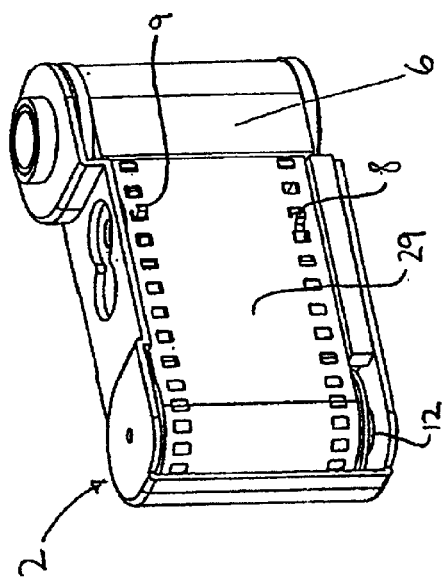
FIG. 4 is the same drawing as FIG. 3 but with film added.

FIG. 4 shows the film 29 that has been loaded into the film cartridge 2. The film, from the unexposed film spooling region 12, is passed through the dark room, is engaged with the advance sprockets 8 and 9 and is collected by the film collection spool 6. The film in the film cartridge is for example a standard 35 mm film scroll that is loaded in to the film cartridge by the factory. In this way the user does not have to consider handling, exposure and contamination issues of the film. The rolling structure of the camera body is attached to the sprockets 8 and 9 of the film cartridge and it rolls the film back to the used film spool region which for example includes the film canister. The canister is for example a standard container for 35 mm films and therefore allows the film to be processed normally by any camera shop after the film is removed from the film cartridge. The advancement of the film may however be the other way around where it is dispensed from the canister as opposed to collected therein.

Figure 5:
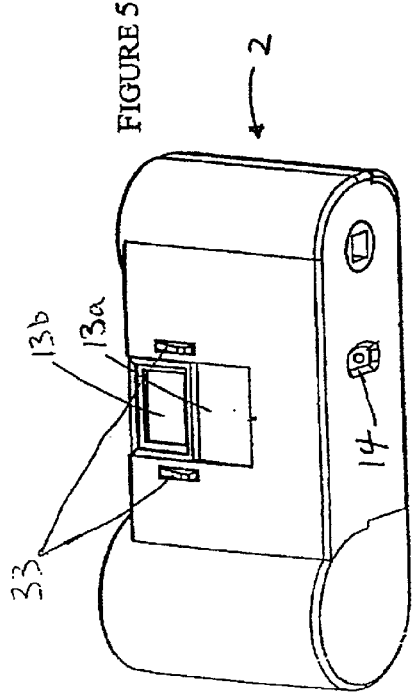
FIG. 5 is a perspective view of the front of the film cartridge showing the window and various operating features.

The region of the cartridge where the film extends across the dark room requires control of the light such that when the cartridge is not engaged with the camera body, any film extending across the dark room is not undesirably exposed. However, at the same time, the dark room does require light to be accessible into the dark room when the cartridge is engaged with the camera body for taking a photograph. The dark room 10 has a light opening or film cartridge aperture 22 which allows for such light as controlled by the shutter of the camera body, to expose that portion of the film in the dark room. The film cartridge aperture however is preferably closed when the cartridge is not engaged with the camera body. This closure is preferably achieved by a film cartridge door 13. FIG. 5 shows the film cartridge door 13 which comprises two portions, the first portion 13a being light impermeable and the second portion 13b being an opening through which light may permeate. The film cartridge door 13 is in a condition to prevent light from entering the dark room through the film cartridge aperture 22 at least during times when the cartridge is not fully engaged with the camera body.

Figure 7:
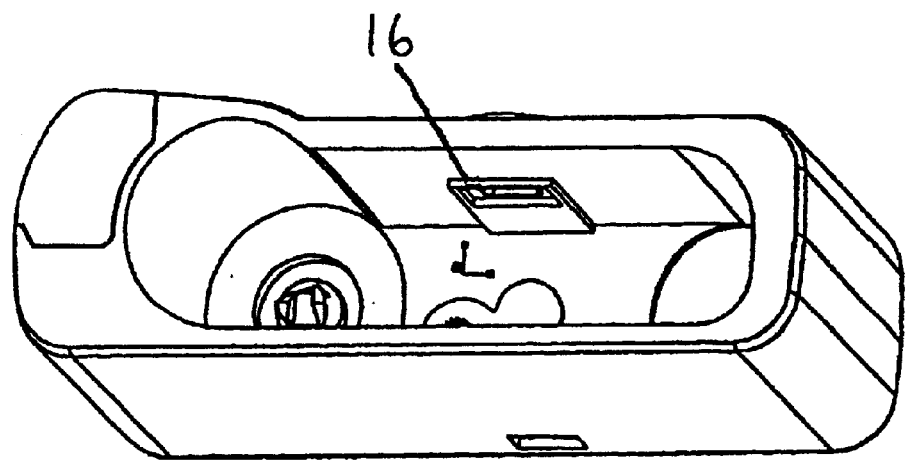
FIG. 7 shows the partial insertion of the film cartridge into the camera body and shows the operation of the film cartridge door.

FIG. 5 shows one embodiment of the film cartridge 2 wherein safety releases 33 prevent the movement of the film cartridge door 13 unless it is correctly engaged with the camera body. In this particular embodiment the insertion of the film cartridge 2 into the film body 1 activates the safety releases to allow the film cartridge door to be opened as illustrated in FIG. 7. The location of the film cartridge by insertion also then opens the film cartridge door 13, thereby placing the film cartridge in a state ready for exposure by the camera body shutter mechanism to expose the film on demand by the user the film and thus create an exposure on the film of the image captured.

FIG. 6 shows the fully assembled film cartridge 2 with the backing plate 15 attached whereby the film inside is safely guarded against any light penetrating and thus pre-exposing the film. The film cartridge is therefore ready for use by insertion into, or association with, the camera.

Figure 10B:
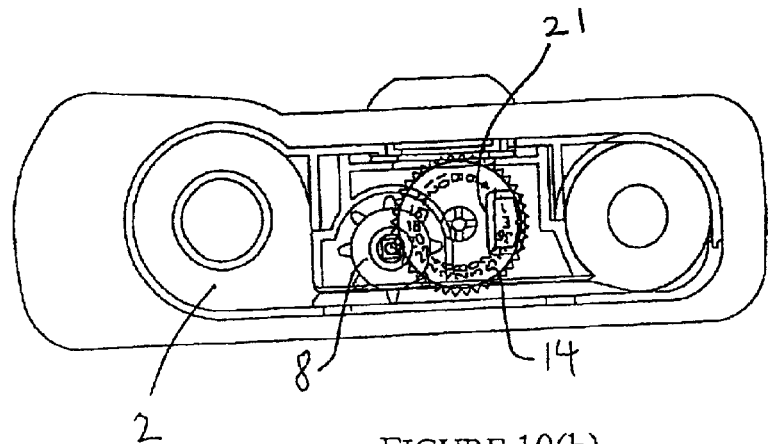
FIG. 10(b) shows a camera body and film cartridge assembled together viewed from the bottom showing the means with which the photographs remaining on the film are counted.
Figure 10A:
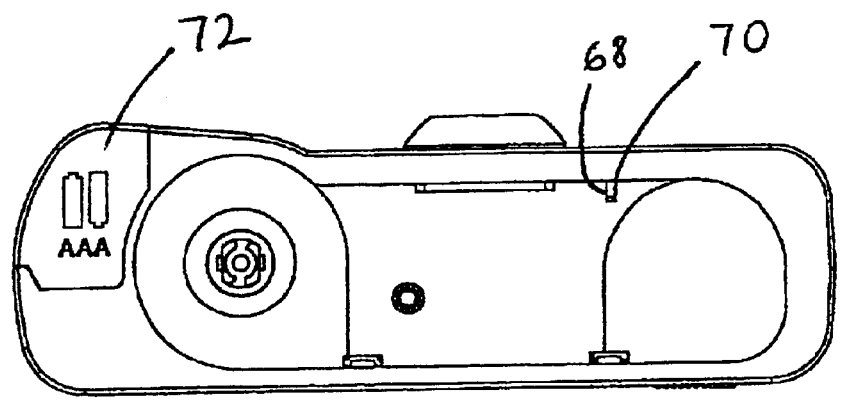
FIG. 10(a) shows a bottom view of a camera body and film cartridge illustrating how they are indexed into their relative positions.

To direct the cartridge into a precise location in the camera body, the cartridge has an index groove 68 seen in FIG. 6(a). As seen in FIG. 10(a), the camera body interior wall has an elongate protrusion 70 shaped to be received in the groove 68 only when the cartridge is properly aligned in the camera body, and the cooperating groove 68 and protrusion 70 are in continuous engagement to properly position the cartridge when installed. A camera operating component power supply, here electric battery 72, may also be in the cartridge and, through appropriate contacts in the cartridge and camera, powers the camera systems.

Figure 8:
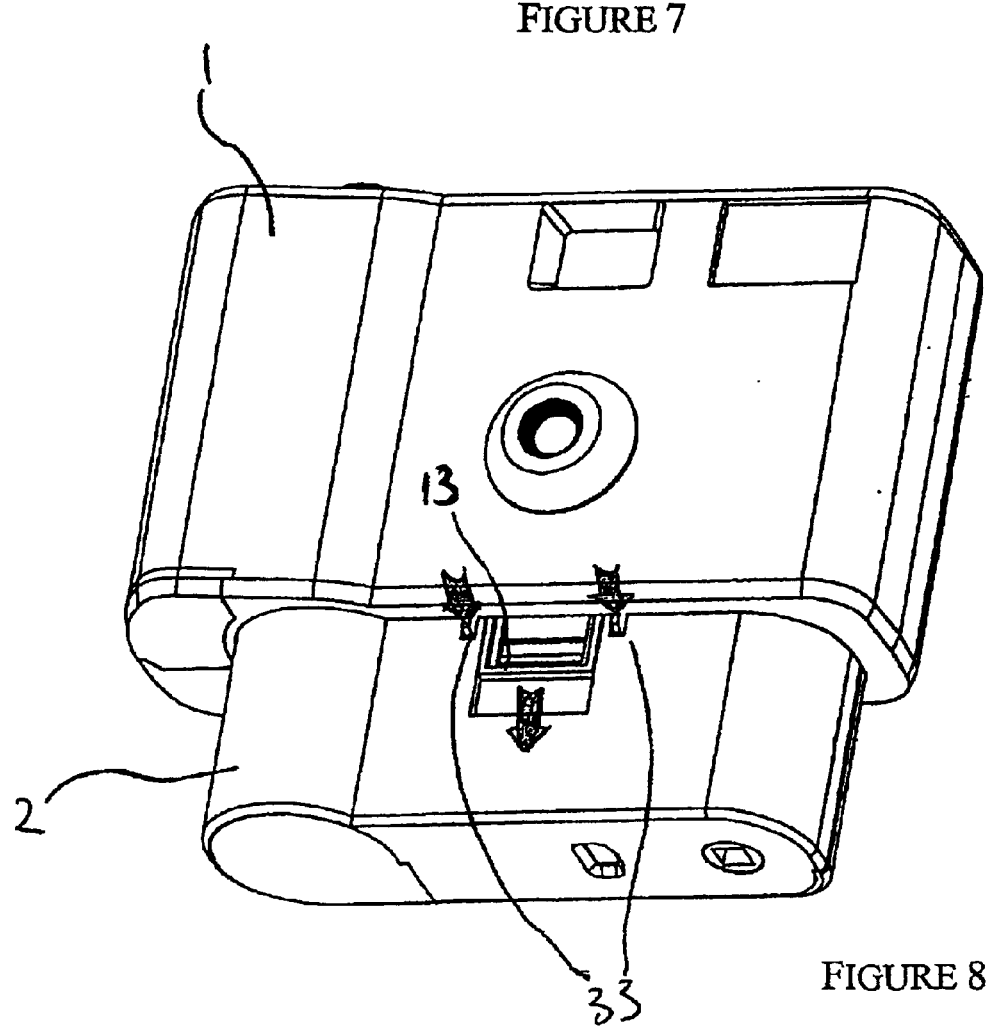
FIG. 8 shows the camera body from underneath showing the features that operate the film cartridge door.

In FIG. 7 the safety releases 33 are activated when the film cartridge 2 is inserted into the camera casing 1 by the front inside panel of the camera casing. Once these safety releases have been activated, the film cartridge door 13 is then free to slide out of the way when the cartridge is safely within the camera body, by the film cartridge door moving means 16 shown in FIG. 8. In this way the film cartridge (and thus the film) can safely be removed and inserted at will by the user with there being no risk of undesired exposure of the film.

Figure 9B:
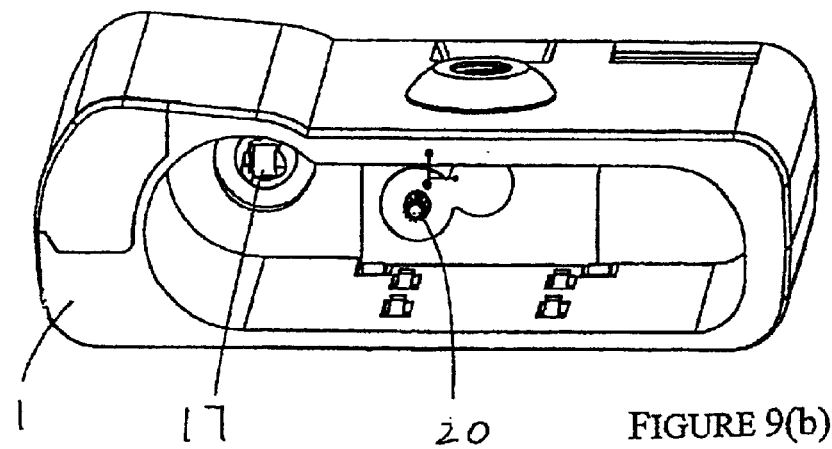
FIGS. 9(a) and 9(b) show the bottom and top of the camera and film cartridge respectively and illustrate some of the film advancement and control features.
Figure 9A:
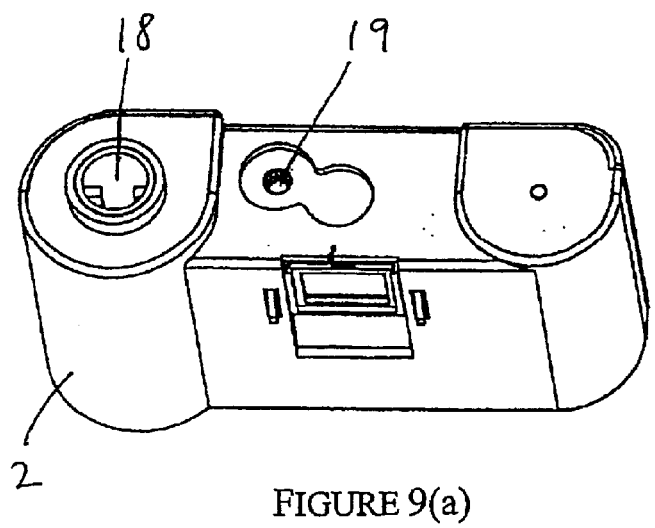

FIG. 9 shows the association of the controls within the camera casing 1 in FIG. 9(b) to those mounted on top of the film cartridge 2 in FIG. 9(a). The film wind on control 17 of the camera body engages to a receiving means 18 on the film cartridge. In this way, wind on of the film effected by the user on the camera body will be transmitted to the actual film in the film cartridge. The top film advance sprocket has receiving means 19 associated with it to engage with an interlock control 20 in the camera body. The interlock control prevents the double exposure of the film. The arrangement may work whereby the means to activate the camera shutter mechanism and thus take a photograph is only enabled when the film has been wound on. In a situation where the film has not been wound on from a previous photograph having been taken, then the camera shutter mechanism activation means will not be enabled. The film counter 14 can be seen in FIG. 5, which records the number of photographs either taken or remaining on the roll of film. The film counter 14 as shown in FIG. 10 is visible through an aperture 21 in the base of the film cartridge 2, and is shown in FIG. 10. By direct association with the bottom winding sprocket 8 the number of exposures taken, and or remaining on the film roll can be known.

Figure 11A:
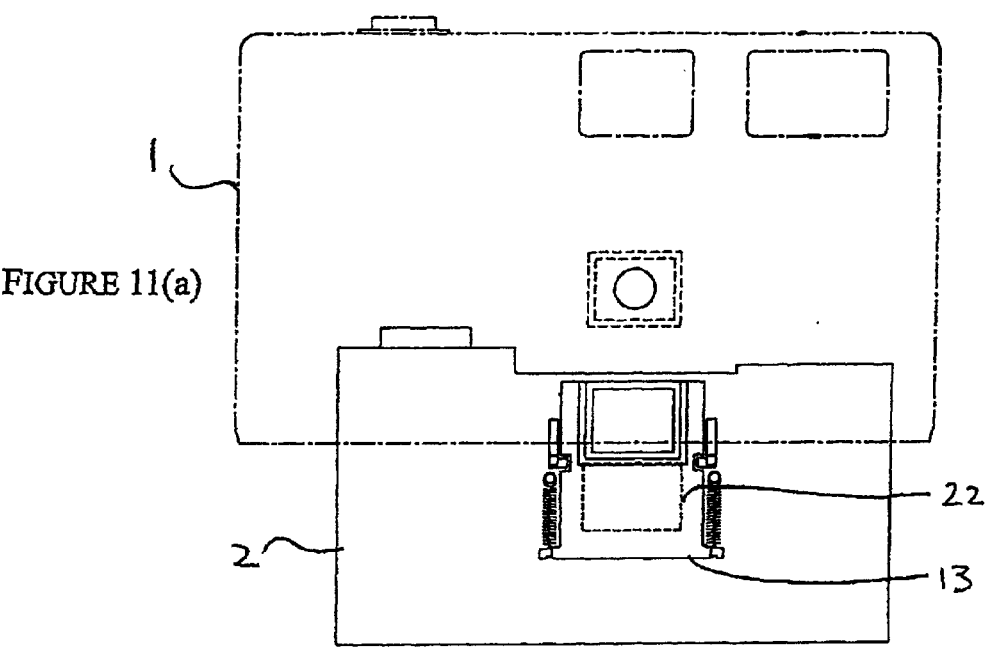
FIGS. 11(a) to 11(c) show the insertion of the film cartridge into the camera and in doing so the opening of the film cartridge door.
Figure 11B:
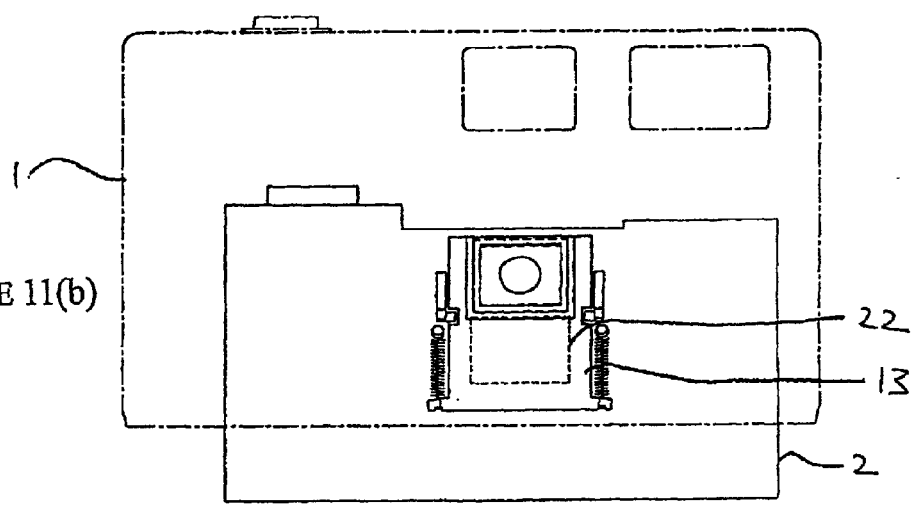

FIGS. 11(a) (b) and (c) show a series of movements of the film cartridge door 13 by translation to progressively open the film cartridge aperture 22. The film cartridge 2 is shown in FIG. 11(a) partially inserted into the camera body 1. The L-shaped safety lock element 3 engages the cartridge door 13 holding it closed. FIG. 11(b) shows the film cartridge 2 inserted into the camera body 1 just prior to engagement of the film cartridge door 13 with means (not shown) to open the film cartridge aperture 22. Final insertion of the film cartridge 2 into the camera body 1 releases the safety lock 3, either by swinging the lock elements outward of the receiving slots in the door 13 or perhaps by breaking off the locking tab ends of the lock elements 3. The insertion moves the film cartridge door 13 completely and opens the film cartridge aperture 22 thus allowing a photograph to be taken upon pressing of the shutter activation button 23. The film cartridge door is normally held closed when the film cartridge is out of the camera cartridge by springs 24(a) and (b) which attach to the film cartridge at their upper point and to the film cartridge door at their lower point.

Figure 8D:
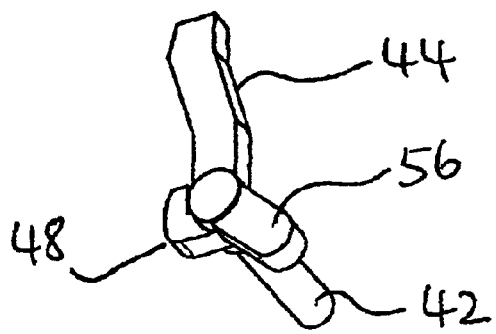
FIGS. 8(d), 8(e) and 8(f) are respectively perspective side and front views of a safety lock for the cartridge door.
Figure 8E:
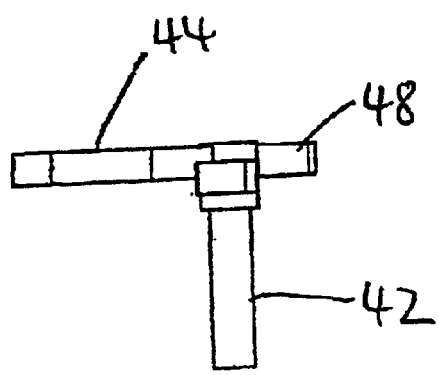
Figure 8F:
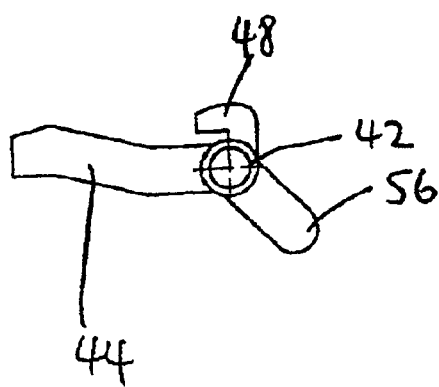
Figure 8G:
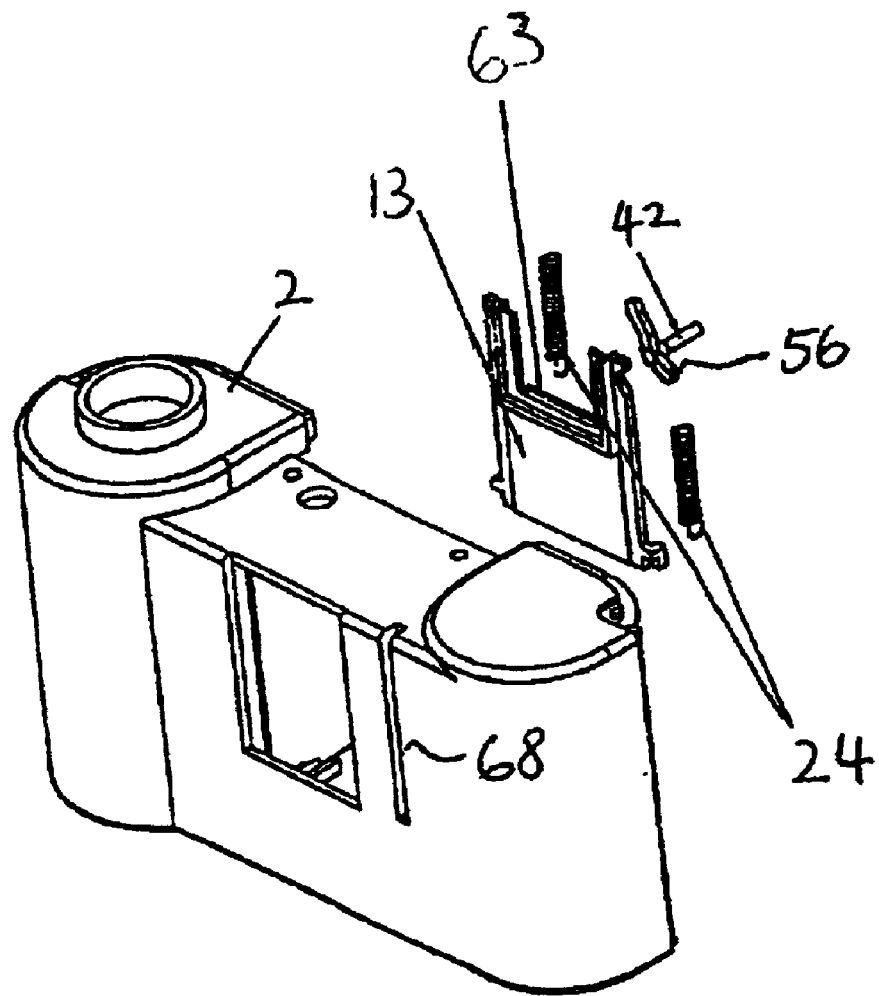
FIG. 8(g) shows the cartridge and the door separated from each other.

FIG. 6(a) is an exploded view showing the various components of the cartridge, including the preferred embodiment of the safety lock. The safety lock, shown in FIGS. 8(d), 8(e) and 8(f) is an integral pivotal unit including a shaft 42 that is received in a pivot opening in the body of the cartridge adjacent to door 13. A latch arm 44 is normally pivoted as shown in FIG. 8(a) into a notch 46 at one side wall of the door 22. This latching holds the door 13 over the film cartridge aperture (not shown in FIG. 8(a)), blocking entrance of light into the film cartridge. The top edge 63 of the door 13 abuts an abutment 64 that positions the door. A hook 48 supports the upper end 52 of the drive spring 24. The lower end of the spring 24 is attached on the spring tab 54 at the bottom of the door 13. A latch release lever 56 protrudes through an opening 58 in the side of the bridging portion and dark room 60 of the cartridge. Upon insertion of the cartridge into the camera from below, the latch arm 44 remains in the notch 46 until the cartridge is inserted sufficiently that the latch release lever 56 protruding from the side of the dark room portion of the cartridge contacts the safety release 33 in the form of an upstanding abutment projecting toward the lever 56 and the abutment 33 being of height sufficient that it remains in contact with the lever 56 pushing it inwardly of the opening 58 as the cartridge is filly installed in the camera body, which as shown in FIG. 8(b), unlocks the still closed door. Once the door is unlatched, then as shown in FIG. 8(c), the compressed springs 24 expand to drive the door 13 downward and open the film cartridge aperture 22 to passage of light. The film cartridge aperture no longer seals the outside light by the aperture sealing panel 64 of the door 13.

As the cartridge is removed from the camera body, the door 13 must be restored to its closed condition blocking the film cartridge aperture. To raise the door 13 against the bias of the compression spring 24, an abutment protrudes inward from the camera body to engage and push the door upwardly until the latch 44 again settles into notch 46, at which a abutment need no longer support the door and the cartridge body can be forced past the abutment and removed with the door 13 closed and relocked by the latch on 44 to the condition shown in FIG. 8(a).

Figure 11C:
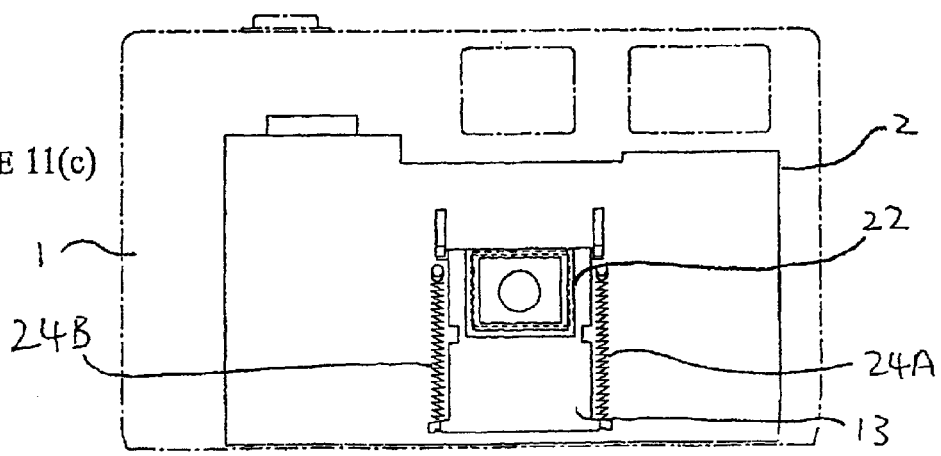
Figure 12A:
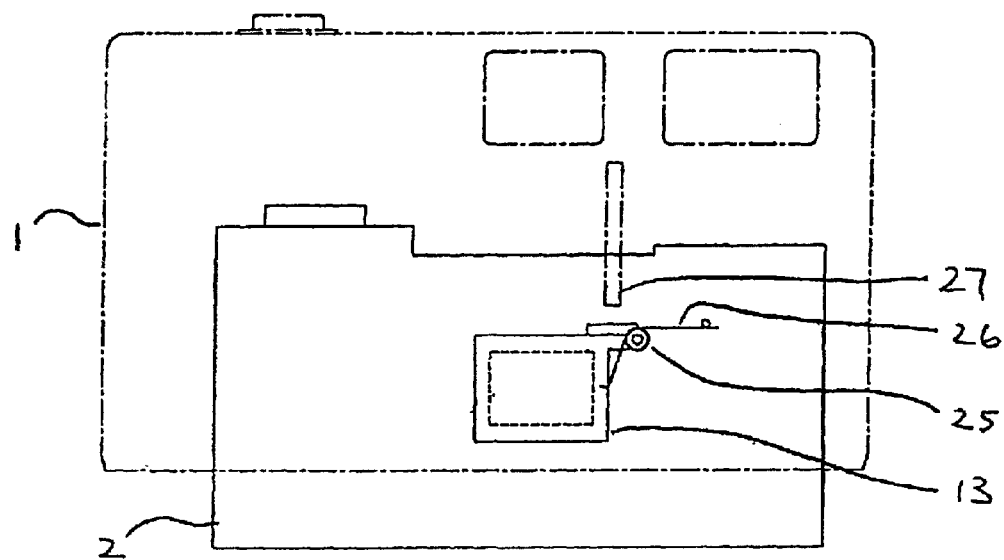
FIG. 12(a) and FIG. 12(b) show an alternative embodiment for the opening of the film cartridge door as the film cartridge is inserted into the camera body.
Figure 12B:
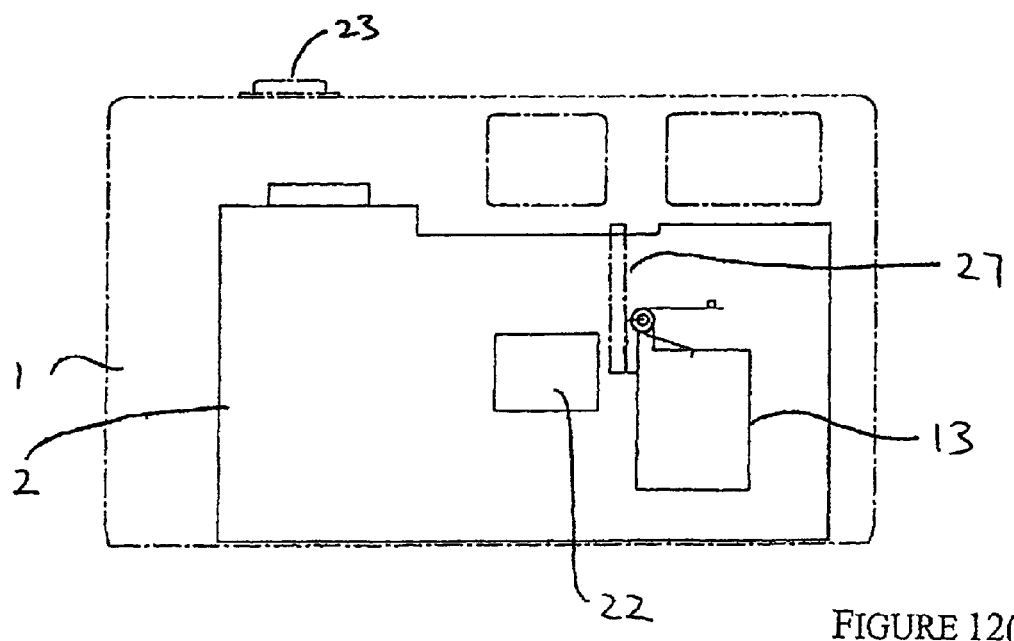

FIGS. 12(a) and (b) show an alternative means to that of FIG. 11 for opening the film cartridge door upon insertion of the film cartridge 2 into the camera body 1. FIG. 12(a) shows the film cartridge 2 partially inserted into the camera body 1. The film cartridge door 13 is rotatably supported by a pivot 25 and held in place by a spring means 26. A film cartridge door opening means 27 is located within the camera body. Upon final insertion of the film cartridge 2 into the body of the camera 1 as depicted in FIG. 12(b), the opening means 27 bears upon the film cartridge door 13 and rotates it, in this case, by for example 90 degrees, to open the film cartridge aperture 22. In this way correct operation of the camera shutter by the shutter activation button 23 will take a photograph of the viewed image.

Figure 13A:
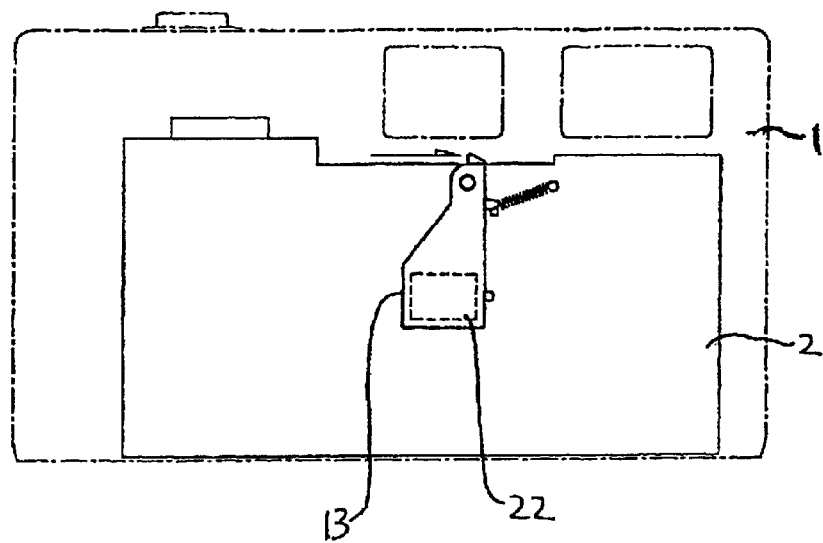
FIG. 13(a) and FIG. 13(b) illustrate a method where the camera shutter is actuated to thus exposing the film.
Figure 13B:
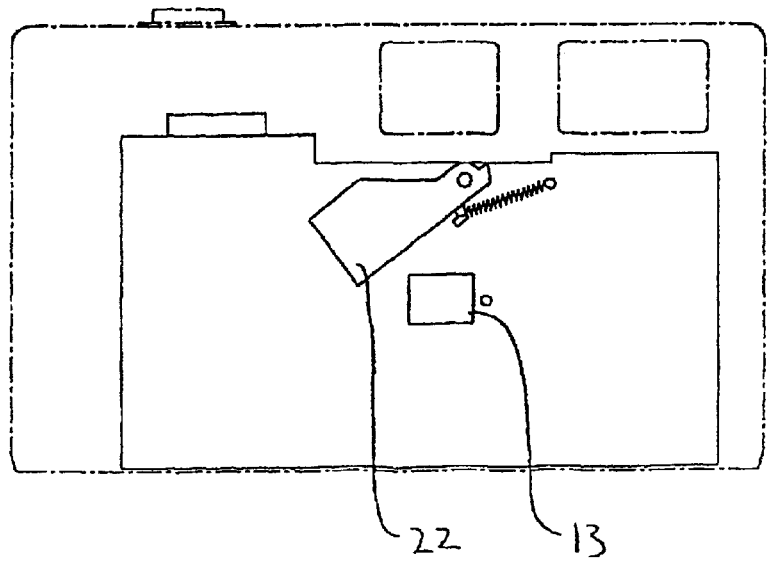

FIG. 13(a) shows a film cartridge 2 fully inserted into the camera 1 and a film cartridge door 13 covering the film cartridge aperture 22. FIG. 13(b) shows the aperture 22 uncovered by rotation of the film cartridge door 13 to the left. Here the film cartridge door doubles as the camera shutter mechanism and also as the film cartridge door. The taking of a photograph by activation of the shutter button 23 activates the film cartridge door to rotate to one side and thus expose the film (which is also the camera shutter) to the image.

Figure 14A:
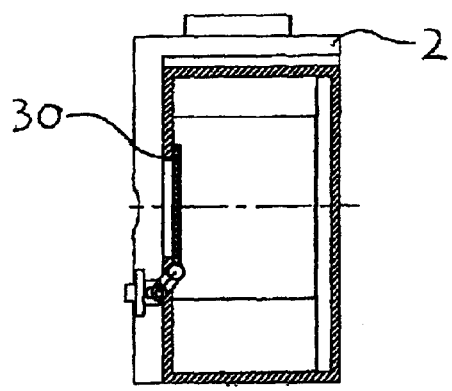
FIG. 14(a) and FIG. 14(b) show an embodiment where the door for opening the dark room is part of the film cartridge but actuated by an actuator means of the camera body.
Figure 14B:
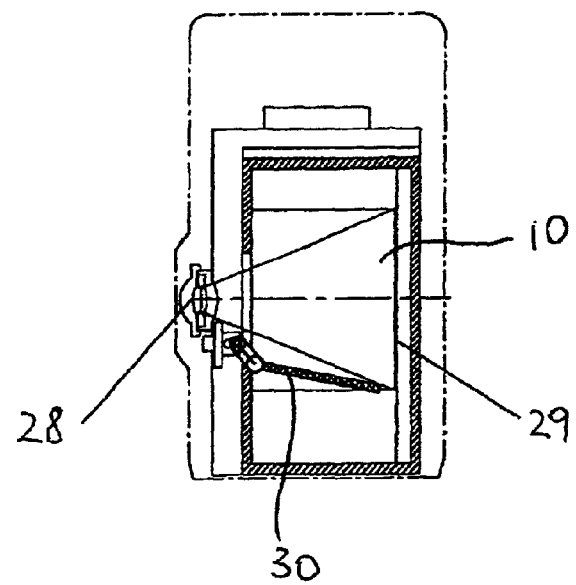

FIGS. 14(a) and (b) show an alternative means for film exposure. A cartridge door mechanism 30 in FIG. 14(a) is closed. Activation of the door is achieved by a button accessible from the exterior of the camera and the door folds into the dark room 10. Once the door is open the camera can be used at will to take photographs by the provision of the aperture, lens and shutter of the camera body.

Figure 15:
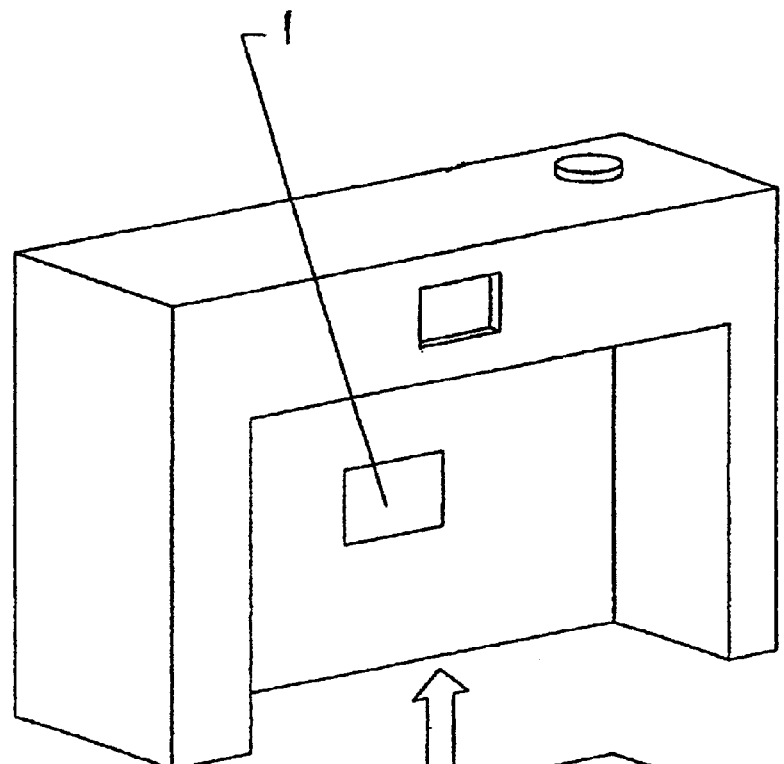
FIG. 15 shows an embodiment where the film cartridge is slid up and into the camera body.
Figure 15:
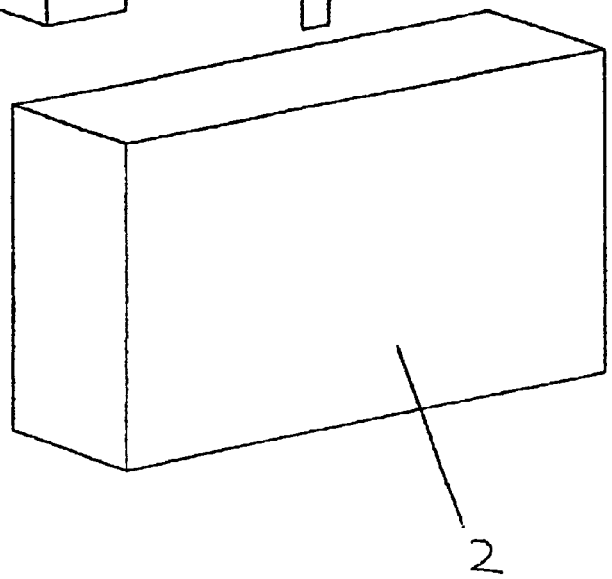
Figure 16:
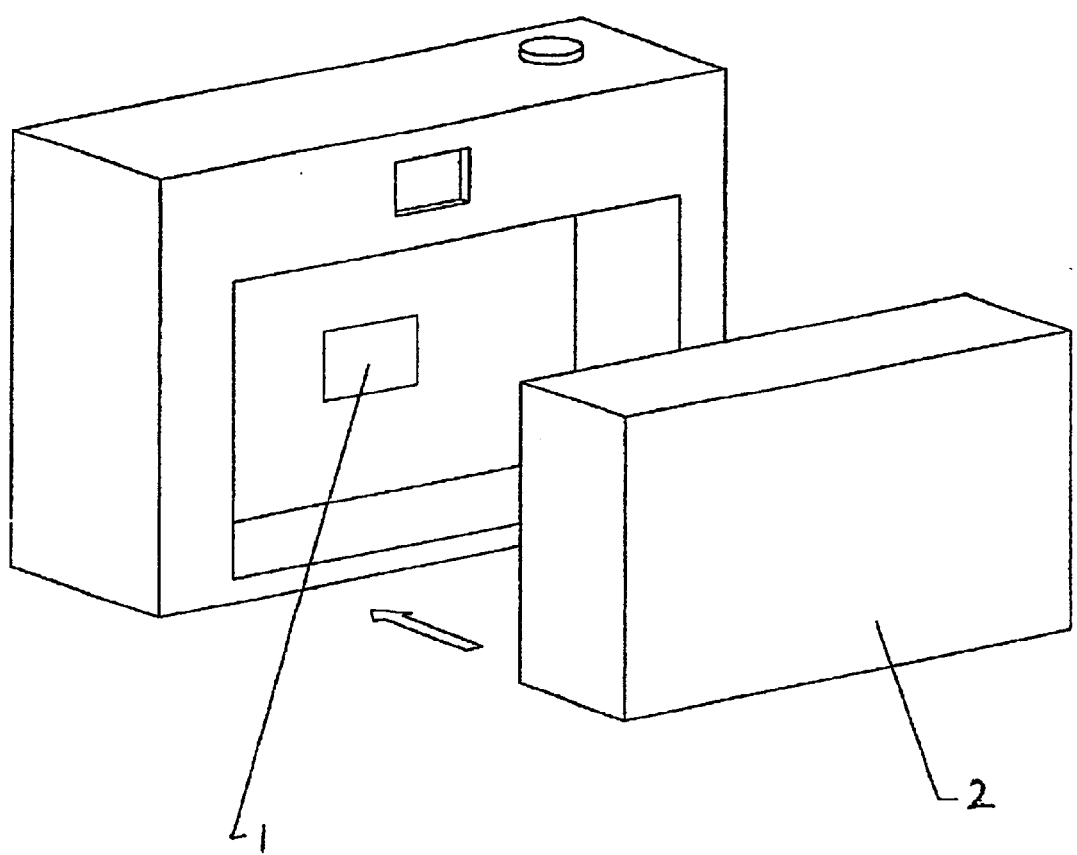
FIG. 16 shows an alternative film cartridge insertion embodiment whereby the film is inserted from the back of the camera body.
Figure 17:
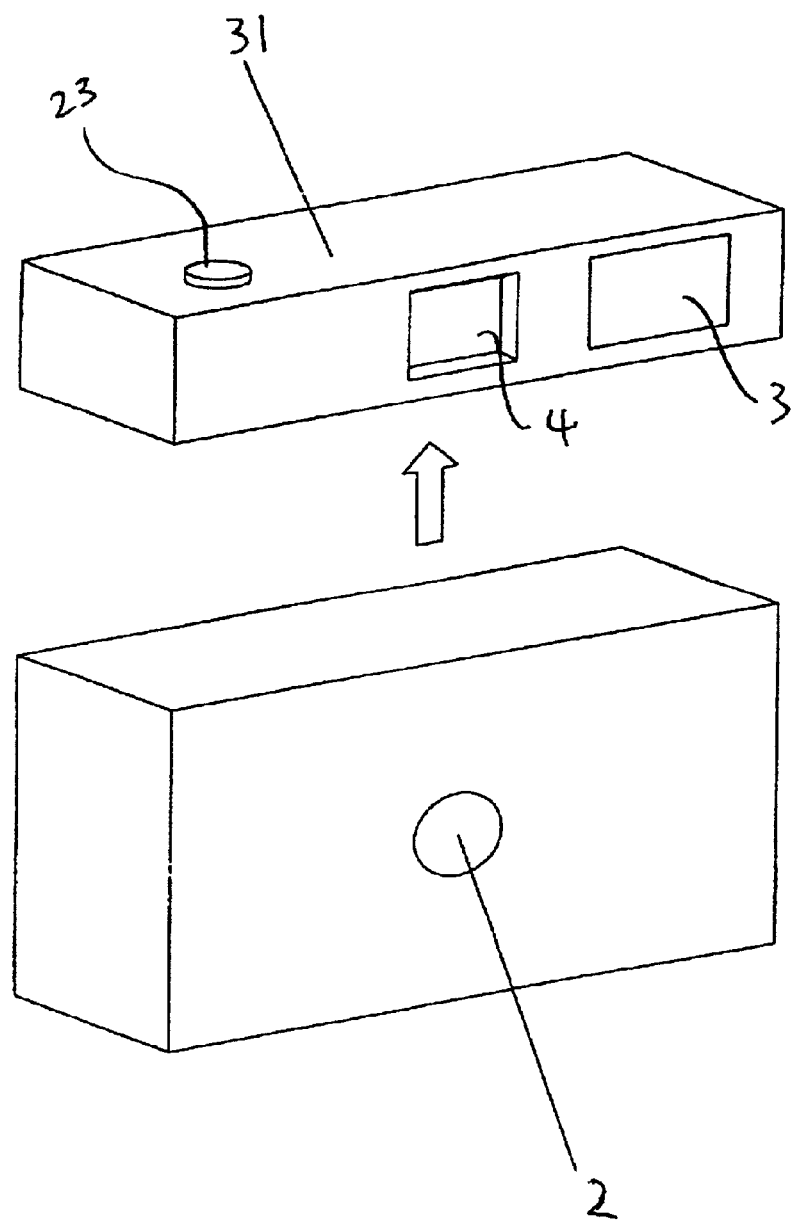
FIG. 17 shows a further alternative embodiment of the invention whereby the film cartridge comprises body of the camera including the camera shutter mechanism and a top section which comprises the control means and also the viewing and flash means.

One embodiment of the camera 1 and the film cartridge 2 is shown in FIG. 15, whereby the film cartridge 2 is brought into the camera from beneath and locked into position. FIG. 16 shows an alternative embodiment whereby the film cartridge 2 is inserted into the camera 1 from the rear face of the camera 1 and locked into position. FIG. 17 shows a further alternative embodiment whereby the film cartridge 2 contains not only the film and the exposure means but also the lens and is itself a component of the camera which the user will hold onto. This combination film-cartridge-camera body is then attached to control body 31 which includes the shutter activation button 23, the viewing means 4, and the flashlight means 3 which may be electrically powered by a battery in the cartridge. In this way the camera body is reduced to the bare minimum needed to activate, control and aim the camera and the film cartridge attaches to it and is the disposable or reattachable component.

Figure 18:
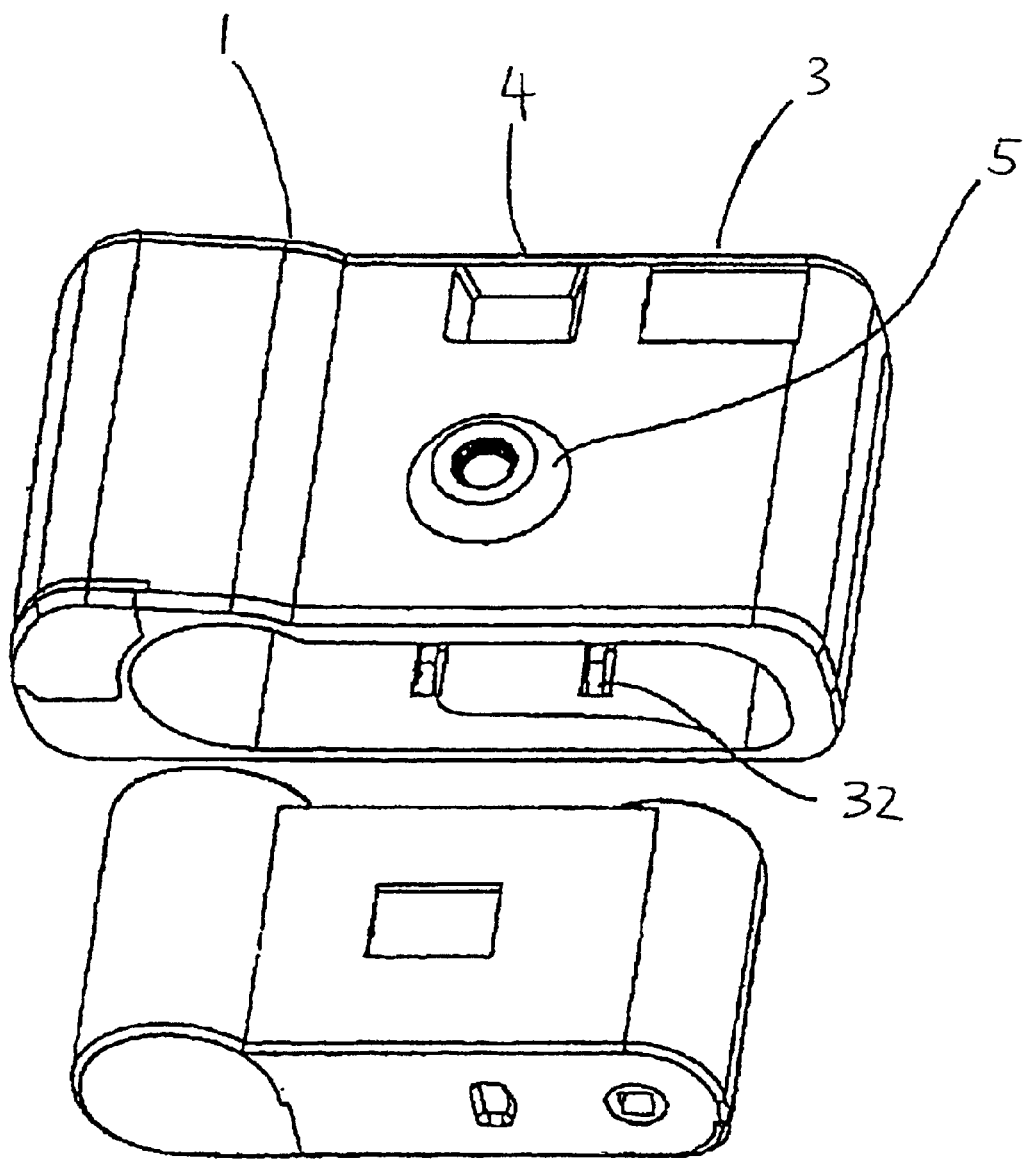
FIG. 18 show a different embodiment of the film cartridge of the present invention where no door is provided to light seal the dark room of the bridging portion.

It is also envisaged that the cartridge of the present invention, for example shown in FIGS. 3–6, may come in a form where there is no door provided and where the aperture 22 for the dark room 10 is not light sealable independent from being engaged with the camera body. This embodiment is for example shown in FIG. 18. The cartridge in this form may for example be substantially provided as shown in FIGS. 3–6 save for the provision of the door 13. The cartridge in a pre-used condition for example provides the film in a preloaded condition where the film is collected by a canister 6 provided at the second spool region and a substantial portion of the film is spooled in the unexposed film spooling region 12. That portion of the film extending between the two spooling regions and through the dark room will in such situations be exposed to light entering through the aperture 22. In such a pre-used condition the first frame of the film will be exposed. However, once the cartridge is inserted into the camera body, the subsequent winding on of the film onto the canister 6 will present the subsequent frames for appropriate exposure in capturing the image projected through the lens aperture and shutter of the camera body. The images that are then captured and wound onto the canister will then be retained in the canister in a light sealed environment. In order to ensure that the unexposed film in the unexposed film spooling region also remains unexposed at times where the cartridge is external of the camera body, this unexposed film spooling region is also light sealed. Such light sealing is preferably achieved by ensuring that the film extending from the unexposed film spooling region extends through a very narrow slot (as for example similar to the slot provided in the film canister) thereby preventing light from entering into the unexposed film spooling region. Such configuration is desirable whether or not the cartridge is provided with or without the door. Should the cartridge be removed from the camera midway during use, that frame presented in the dark room will become exposed to light. However, upon reinsertion of the cartridge into the camera body or another camera body, it merely requires the winding on of the film to advance the film to present an unexposed frame in the dark room for the subsequent exposure for capturing the next image. At the end of use of the cartridge, the film will have been wound on fully into the canister which can then be removed from the casing of the cartridge for processing by standard processing equipment.

Figure 19:
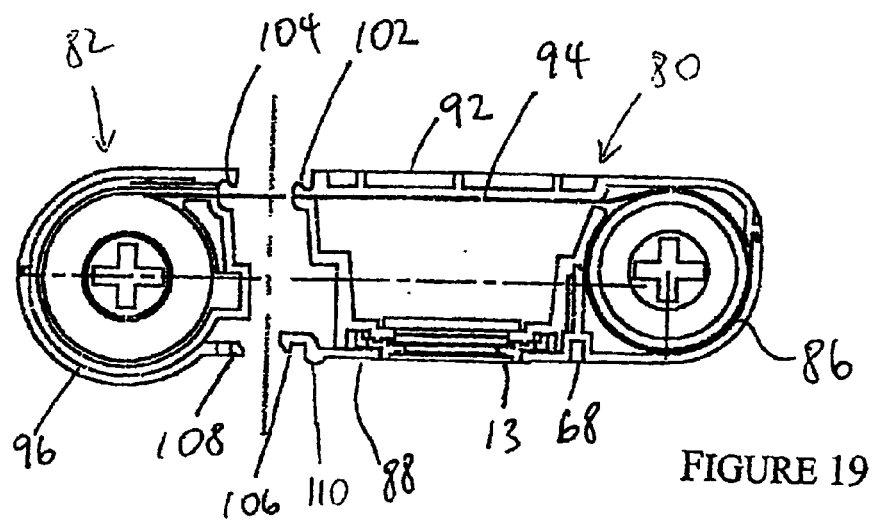
FIG. 19 is a cross sectioned view of an alternative cartridge design, viewed in the direction of arrows 19 in FIG. 20.
Figure 20:
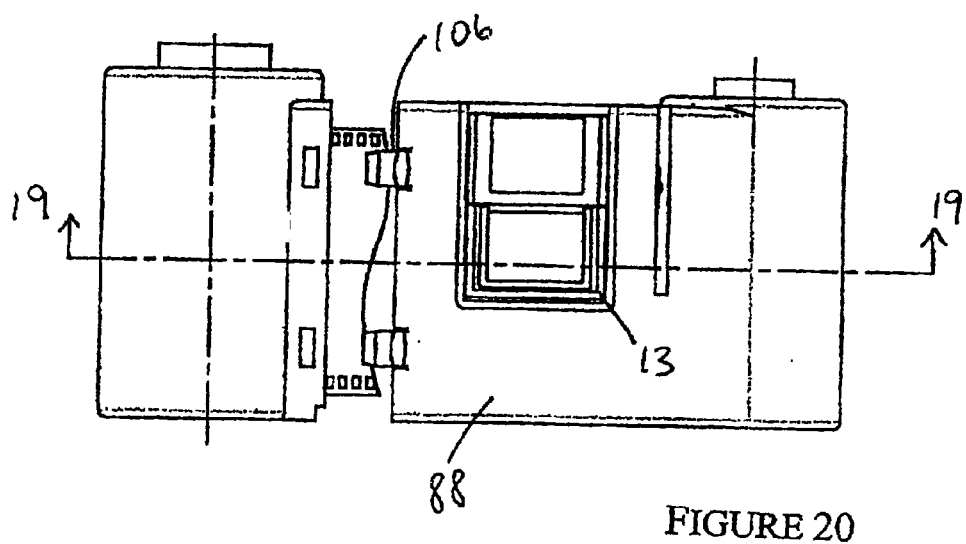
FIG. 20 is a front view of the alternative cartridge design.
Figure 21:
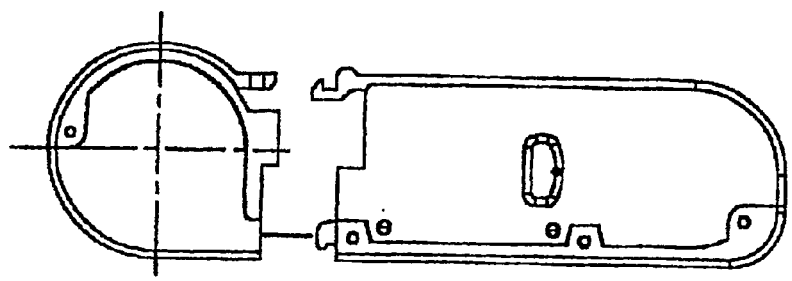
FIG. 21 is a bottom view of the alternate cartridge.

FIGS. 19, 20 and 21 illustrate an alternative embodiment of a film cartridge 80 comprised of two main parts, the exposed film spooler region 82 where the exposed film is collected and the rest 84 of the cartridge 84. The unexposed film is retained in a first spool region 86 of the rest of the cartridge 84. That portion 84 also includes the door 13 aperture 22 and the front 88 and rear plate 92 of the cartridge. The cartridge parts 82 and 84 are manufactured separately and after the film is loaded, they may be joined. The film 94 is drawn out of the region 86 toward the spool 96 which may be a film cannister or a wind-up reel.

After the initial portion of the film is wound on the spool 96, the cartridge parts 82 and 84 are adjoined. Illustrated are upper and lower sets of cooperating projections 102 on part 84 and cooperating locking groove 104 on part 82. To separably latch the cartridge parts, at the front of the cartridge there are two hooks 106 on part 84 which snap into receiving grooves or openings 108 on the cartridge part 82. With the projection 102 and the latch 104 and the latch 106 snapped into the groove 108, the cartridge is integrated. Upon completion of photography and whether it is desired to remove the wound film from the camera, the portions of the cartridge may again be separated for example by applying force to the release button 110 on the latch 106 for separating the latch 106 from the groove 108, and thereafter separating the projection 102 from the notch 104. A film cannister can be removed from the spooling region 96.

This cartridge also permits reloading, since new film may be loaded with a spooler in the portion 84. This arrangement has the benefit of enabling reloading of the cartridge with new film without having to thereafter form the cartridge around the installed film and more important, enables removal of film from the cartridge simply and without destroying the cartridge, which enables the cartridge to be reused.

This arrangement is also particularly useful for a loading technique where the supply of unexposed film is provided in a conventional film cannister, which can be put into the spooling region 96. Then the film to be used for the photography is led out of the spooling region 96 and wound into the spooling region 86, and before photograph begins. During photography, the film would be refed back to the cannister at region 96 so that by completion of photography, exposed film would be back in the cannister at region 96, which cannister had supplied the initial unexposed film.

The film cartridge can easily be ejected from the camera body when a switch is pushed releasing the film cartridge from the camera body. The camera body can in this way be used many times, and the film cartridge may also be recycled with new film loaded into it. Further, the removable/replaceable feature as indicated above enables the change of different types of film to suit different uses (e.g. different ASA) or the grouping of photos of a particular nature in a particular roll of film/film set (e.g. different occasions, different groups of people, different subject matters etc). Interchangeability of camera bodies for one film cartridge can also be achieved with the present invention. A camera body which provides particular features such as a wide angled lens, a colored lens or other effect type lens may be provided, where the film cartridge of the present invention is interchangeable between such bodies.

Figure 22:
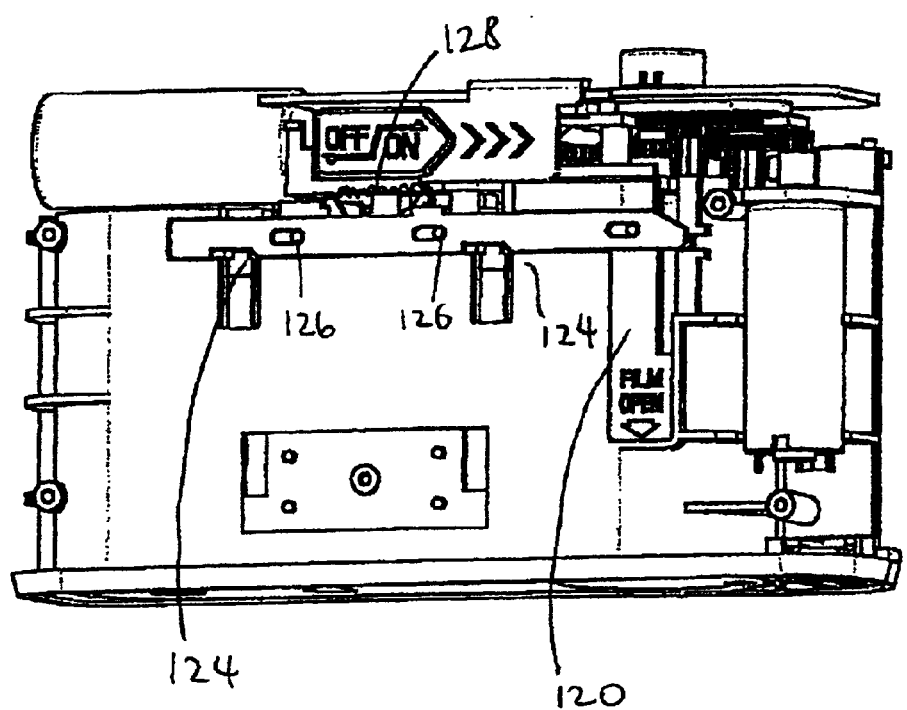
FIG. 22 is a rear view of the camera with the backing plate removed.

FIG. 22 shows a rear view of the camera body including the means that engages an installed film cartridge. There is a film open switch 120 which when operated permits removal of the film cartridge. That film open switch is in turn connected with a release lever 122 which translates left and right and in the illustrated condition to the left frees the detent tabs 124 to press against the backing plate of the film cartridge and can be retained there. The film cartridge back side has recesses therein adapted to receive those tabs 124 which locks the film cartridge in position.

Movement of the lever 120 downward moves the lever 122 to the right on its support tabs 126 fixed on the back of the cartridge until the lever 122 raises the tabs 124 which releases the bias of the tabs 124 against the cartridge, freeing the cartridge to be released. A spring 128 attached to the lever and to the camera body urges the lever to the left and returns it to the left when the switch lever 120 is raised. The detent tabs 124 are then again in position to be received in the recesses 125 in the back of the film cartridge.

Figure 23:
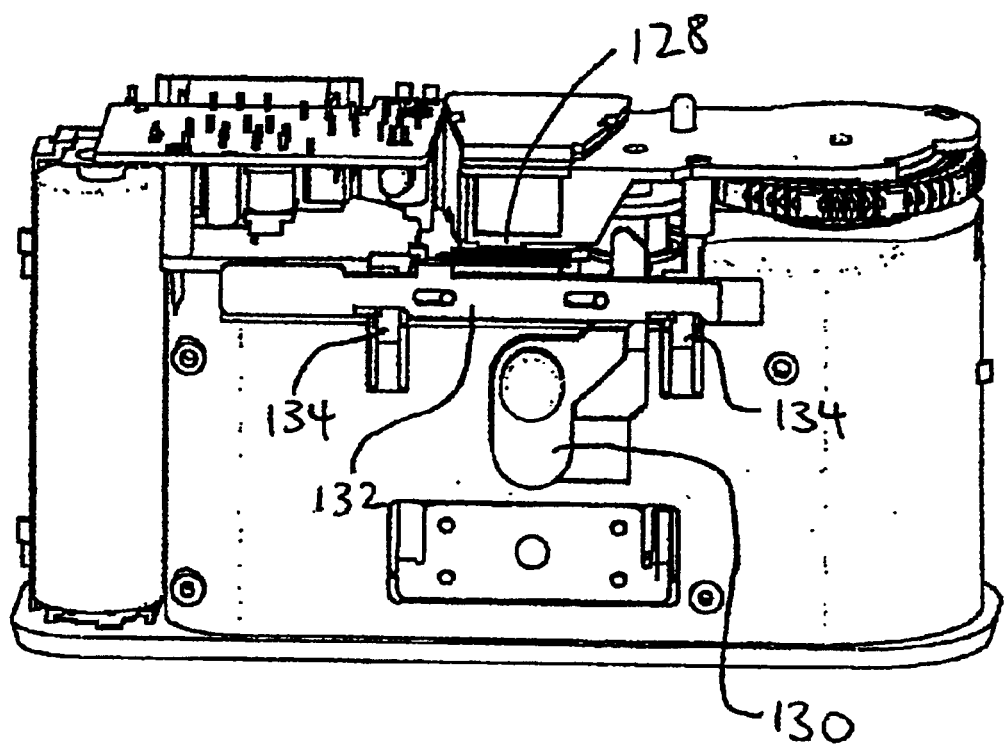
FIG. 23 is a rear view of an alternate for the arrangement for the camera body.

FIG. 23 is a rear view of an alternate view of the back of a camera with some elements exposed. It shows a different shape for the switch lever 132 to release the tabs 134 as in the previous embodiment.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. In combination, a camera body and a photographic film cartridge detachably attachable to the camera body, the combination comprising:

the camera body including a light control device for communicating an image to a film in the cartridge in the camera body, and camera operating elements for permitting communication of an image through the light control device to the film;

the cartridge comprising an unexposed film spool region, a second spool region spaced from the unexposed film spool region and a bridging portion between the unexposed film spool region and the second spool region such tat the film can be advanced from the unexposed film spool region past the bridging portion to the second spool region, and when the cartridge is in the camera body, the bridging portion is positioned with respect to the lens in the camera body so that an image can be captured on film then at the bridging portion:

film operating elements in the camera body and cooperating film operating elements on the cartridge for being operated together for advancing the film in the cartridge from the unexposed film spool region to the second spool region past the bridging portion;

the bridging portion being so shaped with respect to the cartridge and the camera body as to define a dark room for film passing between the unexposed film spool region and the second spool region:

a light transmission opening in the cartridge at the bridging portion, the opening being positioned such that when the cartridge is in engagement with the camera body, and with the opening open, film at the bridging portion is presented for exposure by light passing the lens and the opening in the film cartridge;

a door on the film cartridge, the door is shaped to prevent light from entering through the opening into the darkroom in the cartridge; the door being selectively moveable between a closed position where the door blocks the opening in the cartridge and an open position wherein the door has been moved to open the opening in the cartridge and permit exposure of film at the bridging region in the darkroom;

wherein the door is adapted to remain in the closed position until the cartridge is fully engaged in the camera body;

cooperating devices on the camera body and at the door on the cartridge for moving the door to the open position upon the cartridge being fully engaged with the camera body.

2. The combination of claim 1, wherein when the cartridge and the camera body are fully engaged, the cartridge being shaped to define a region which is light sealed except for light entering the camera body and into the cartridge by the lens for exposing film in the bridging portion of the cartridge.

3. The combination of claim 1, further comprising an actuator connected with the door for moving the door between the open and closed positions.

4. The combination of claim 3, further comprising a safety latch on the cartridge for the door, and the actuator cooperating with the safety latch for releasing the safety latch for enabling movement of the door from the closed position to the open position.

5. The combination of claim 4, further comprising a spring connected with the door for moving the door from the closed position to the open position upon release of the latch.

6. The combination of claim 3, further comprising the door being pivotally supported to the cartridge to pivot between the open and closed positions.

7. The combination of claim 3, wherein to door is supported to the cartridge to translate along the cartridge between the closed and open positions.

8. The combination of claim 4, further comprising the safety latch for the door being operable to free the door to move from the open to the closed position thereof.

9. The combination of claim 8, further comprising a spring for moving the door from the open to the closed position thereof.

10. The combination of claim 8, wherein the actuator is so connected to the cartridge and the camera body as to be operable to move the door between the positions thereof upon engagement and upon removal of the cartridge and the camera body.

11. The combination of claim 3, wherein the actuator is user operable and is operable upon full engagement of the cartridge with the camera body.

12. The combination of claim 3, wherein the camera body includes a shutter at the lens and includes an operator for operating the shutter.

13. The combination of claim 12, wherein the shutter operator is connected with the actuator such that the actuator is operated for moving the door from the closed to the open position upon operation of the shutter.

14. The combination of claim 1, further comprising a film or cannister for the film and located at the unexposed film spool region of the cartridge, such that during advancement of the film past the bridging portion, the film is transferred from the cannister to the second spool region.

15. The combination of claim 1, further comprising a cannister for the film and located at the second spool region of the cartridge, such that during advancement of the film for exposure past to bridging portion, the film is transferred from the unexposed spool region to the cannister.

16. The combination of claim 1, further comprising a shutter on the camera body for selectively blocking and opening the light control device and an operator on the camera body connected with the shutter and operable for opening the light control device.

17. The combination of claim 1, wherein the film cartridge comprises a housing in which the film is disposed and the housing being shaped to seal the film from exposure to light except through the opening closeable by the door.

18. The combination of claim 17, further comprising a narrow slot between the unexposed spool region and the bridging portion through which the film can pass and the slot being narrowed to substantially seal the unexposed film spool region from light.

19. In combination, a camera body and a photographic film cartridge detachably attachable to camera body, the combination comprising:

the camera body including a light control device for communicating an image to a film in the cartridge in the camera body, and camera body and camera operating elements for permitting communication of an image through the light control device to the film:

the cartridge comprising an unexposed film a spool region, a second spool region spaced from the unexposed film spool region and a bridging portion between the unexposed film spool region and the second spool region such that the film can be advanced from the unexposed film spool region past the bridging portion to the second spool region, and when the cartridge is in the camera body, the bridging portion is positioned with respect to the lens in the camera body so that an image can be captured on film then at the bridging portion;

film operating elements in the camera body and cooperating film operating elements on the cartridge for being operated together for advancing the film in the cartridge from the unexposed film spool region to the second spool region past the bridging portion;

the bridging portion being so shaped with respect to the cartridge and the camera body as to define a dark room for film passing between the unexposed film spool region and the second spool region;

a light transmission opening in the cartridge at the bridging portion, the opening being positioned such that when the cartridge is in engagement with the camera body, and with the opening open, film at the bridging portion is presented for exposure by light passing the lens and the opening in the film cartridge;

a door on the film cartridge, the door is shaped to prevent light from entering through the opening into the darkroom in the cartridge; the door being selectively moveable between a closed position where the door blocks the opening in the cartridge and an open position wherein the door has been moved to open the opening in the cartridge and permit exposure of film at the bridging region in the darkroom;

the camera body has an enclosed chamber therein and the cartridge is shaped to be received in and is receivable in the chamber in the camera body to define the combination, and wherein the door is operable to the open position only with the cartridge fully installed in the camera body.

20. A photographic film cartridge for detachable attachment to a camera body, the film cartridge comprising:

an unexpected film spool region, a second spool region spaced from the unexposed film spool region and a bridging portion between the unexposed film spool region and the second spool region such that the film can be advanced from the unexposed film spool region past the bridging portion to the second spool region;

the bridging portion being so shaped with respect to the cartridge and the camera body as to define a dark room for film passing between the unexposed film spool region and the second spool region;

a light transmission opening in the cartridge at the bridging portion, the opening being positioned such that when the cartridge is in engagement with the camera body, and with the opening open, film at the bridging portion is presented for exposure by light passing the lens and the opening in the film cartridge;

a door on the film cartridge, the door is shaped to prevent light from entering through the opening into the darkroom in the cartridge; the door being selectively moveable between a closed position where the door blocks the opening in the cartridge and an open position wherein the door has been moved to open the opening in the cartridge and permit exposure of film at the bridging region in the darkroom;

an actuator connected with the door for moving the door between the open and closed position; and a safety latch on the cartridge for the door, and the actuator cooperating with the safety latch for releasing the safety latch for enabling movement of the door from the closed position to the open position.

21. The cartridge of claim 20, further comprising a spring connected with the door for moving the door from the open to the closed positions upon release of the latch.

22. A photographic film cartridge for detachable attachment to a camera body, the film the film cartridge comprising:

an unexposed film spool region, a second spool region spaced from the unexposed film spool region and a bridging portion between the unexposed film spool region and the second spool region such that the film can be advanced from the unexposed film spool region past the bridging portion to the second spool region;

the bridging portion being so shaped with respect to the cartridge and the camera body as to define a dark room for film passing between the unexposed film spool region and the second spool region;

a light transmission opening in the cartridge at the bridging portion the opening being positioned such tat when the cartridge is in engagement wit the camera body, and with the opening open, film at the bridging portion is presented for exposure by light passing the lens and the opening in the film cartridge;

a door on the film cartridge, the door is shaped to prevent light from entering through the opening into the darkroom in the cartridge; the door being selectively moveable between a closed position where the door blocks the opening in the cartridge and an open position wherein the door has been moved to open the opening in the cartridge and permit exposure of film at the bridging region in the darkroom;

the cartridge including a first part having one of the film spool regions and a second part including the other film spool region and the bridging portion;

a separable latching connection between the first and second parts of the cartridge, wherein upon the cartridge parts being latched, film can pass between the spool regions past the bridging portion, and with the parts unlatched and separable, access to the one spool region is enabled.

23. The cartridge of claim 22, further comprising a film or a cannister for the film disposed in the first part of the cartridge and the film is removable from the first part to be drawn past the bridging portion to the spooling region in the second part of the cartridge.

24. The combination of claim 23, further comprising respective cooperating indexing elements on the cartridge and in the camera body positioned to be engaged as the cartridge is being installed on the camera body for positioning the cartridge at a particular location at the camera body to permit light and image to pass to the film in the cartridge.

25. A camera body for receiving a photographic film cartridge in a detachable manner, the camera body including:

a body, a receptacle in the body shaped to the shape of a film cartridge to be disposed in the receptacle;

a light control device on the camera body for passing light into the camera body receptacle to illuminate an area of the cartridge disposed therein;

a holding device inside the camera body receptacle facing toward the cartridge and biased into engagement with the cartridge for retaining a cartridge installed in the camera body; a release mechanism on the camera body associated with the holding device and operable by a user to release the holding device and thereby to release the cartridge for removal of the cartridge from the camera body.

26. The camera body of claim 25, wherein the cartridge holding device in the camera body and the camera body comprises at least one tab supported on the camera body and normally biased into the receptacle to engage the cartridge in the receptacle and retain the cartridge;

a lever connected with the camera body and operable into connection with the at least one tab, a manually operable switch for moving the lever to separate the at least one tab from the cartridge, thereby releasing the cartridge for removal from the camera.

27. The camera body of claim 25, further comprising an indexing projection in the camera body for cooperating with a groove in a removable film cartridge for indexing the orientation and position of the cartridge in the receptacle and holding the cartridge stationery.

28. The camera body of claim 25, further comprising camera operating elements on the camera body including a film advance mechanism far moving the film past the light control device, a shutter for the camera for being operated to open the light control device to pass light and film advancing devices for advancing film that is located iii a photographic film cartridge supported in the camera body past the light control device.

29. In combination, the camera body of claim 26, and a photographic film cartridge detachably attachable in the receptacle of the camera body, recesses in the photographic film cartridge adapted to be aligned with the at least one tab in the body and to have the at least one tab snap into the recesses for locking the cartridge in the receptacle, and the release lever being operable for moving the at least one tab out of the recesses to free the cartridge for removal from the receptacle of the camera body;

an indexing projection in the camera body for cooperating with a groove in a removable film cartridge for indexing the orientation and position of the cartridge in the receptacle and holding the cartridge stationary;

the film cartridge has a groove positioned to be aligned with and receive the projection in the receptacle of the camera body to hold the position of the cartridge.

* * * * *